United States Patent [19]

Miles

[11] 4,364,694
[45] Dec. 21, 1982

[54] TAP HOLDER

[75] Inventor: Wilbur N. Miles, Chagrin Falls, Ohio

[73] Assignee: Erickson Tool Company, Solon, Ohio

[21] Appl. No.: 192,737

[22] Filed: Oct. 1, 1980

[51] Int. Cl.³ .................. B23Q 5/22; B23G 1/46; B23G 5/14
[52] U.S. Cl. ................................. 408/139; 408/141
[58] Field of Search ................ 408/139, 140, 141; 279/16; 64/63; 192/30 R, 37; 10/85 F, 89 H, 135 R, 141 H

[56] References Cited

U.S. PATENT DOCUMENTS

| | | | |
|---|---|---|---|
| 2,375,554 | 2/1944 | Hook | 408/139 |
| 2,778,648 | 1/1957 | Benjamin et al. | 279/18 |
| 3,091,473 | 5/1963 | Bilz | 279/76 |
| 3,171,145 | 3/1965 | Benjamin et al. | 408/240 |
| 3,214,773 | 11/1965 | Benjamin et al. | 192/30 |
| 3,254,353 | 6/1966 | Johnson | 408/141 |
| 3,325,837 | 6/1967 | Hartman | 408/139 |
| 3,791,756 | 2/1974 | Johnson | 408/139 |
| 4,174,918 | 11/1979 | Tanaka | 408/139 |
| 4,274,768 | 6/1981 | Kato | 408/139 |
| 4,277,209 | 7/1981 | Benjamin | 408/139 |

*Primary Examiner*—William R. Briggs
*Assistant Examiner*—Paul M. Heyrana, Sr.

*Attorney, Agent, or Firm*—Maky, Renner, Otto & Boisselle

[57] ABSTRACT

A tap holder characterized in that its cylindrical shank is axially movably and non-rotatably keyed within a tubular socket of a housing by keys having rolling engagement with complemental axially extending V grooves in the shank and in drive blocks disposed in axially extending slots of the socket, and engaged within a retainer sleeve which locates the drive blocks and keys coaxially of the shank for uniform distribution of torque loads to prevent high pressure sliding contact of the shank with the socket under torque load during relative axial movement of the housing and tap holder. The shank is additionally spring-connected to the socket by two coil springs both of which yieldably oppose relative axial movement in one direction and but one of which yieldably opposes relative axial movement in the opposite direction. The tap holder herein is further characterized in that the keys are perpendicularly related cylindrical rollers in each drive block and shank groove for rolling engagement with one pair or the other of parallel faces of said grooves according to the direction of the torque load between the housing and the tap holder during relative axial movement.

5 Claims, 5 Drawing Figures

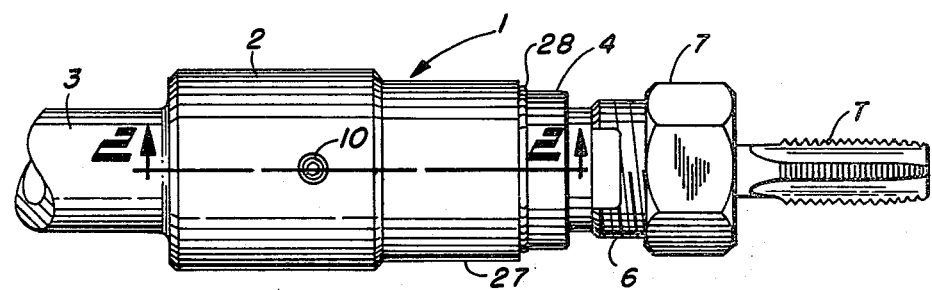
FIG. 1
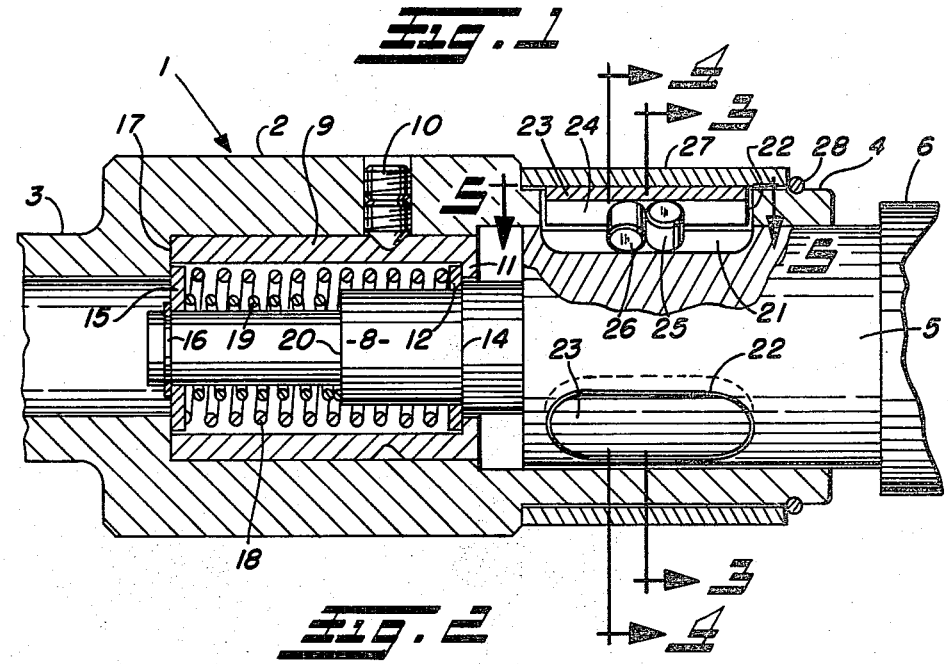
FIG. 2
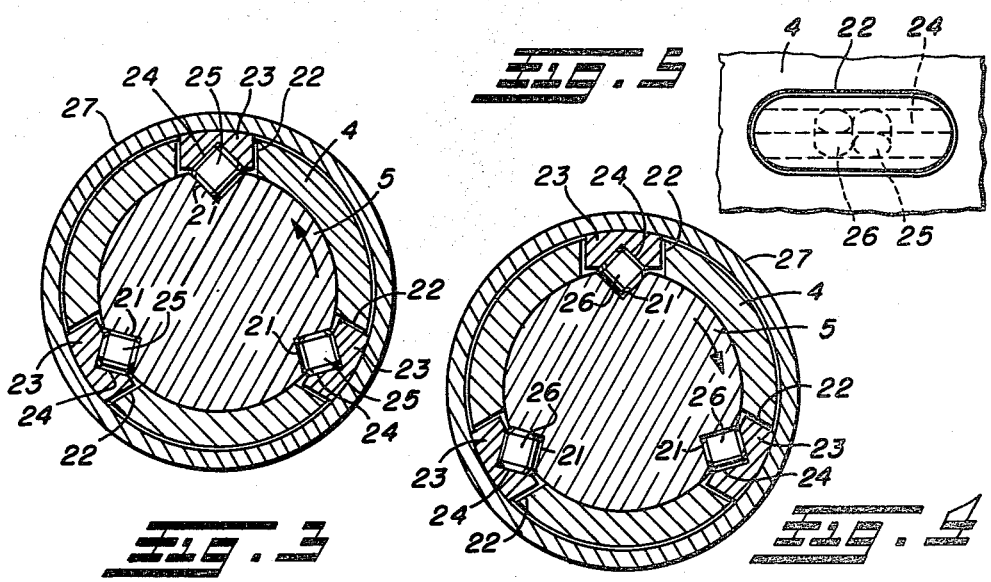

TAP HOLDER

BACKGROUND OF THE INVENTION

It is known as for example from the M. L. Benjamin et al U.S. Pat. Nos. 3,171,145 and 3,214,773 to axially slidably key a tap holder in a housing for yieldable relative axial movement while torque is transmitted from the housing to the tap holder. Keying arrangements as disclosed in these patents under high torque loads entails either substantial sliding friction between the keys and the keyways or high fricton rubbing contact of the side of the shank of the tap holder with the guide bore of the housing socket.

In order to decrease frictional resistance to relative axial movement of a tap holder with respect to a housing it has been proposed as in the Bilz U.S. Pat. No. 3,091,473 to employ torque transmitting balls in axially extending grooves of the tap holder and housing. However, in such construction relative axial movement of the tap holder and housing may entail skidding of the balls and even a minute variation in the angular spacing of the grooves may result in the condition wherein the entire torque load is imposed on a single ball with attendant shifting of the shank of the tap holder into high friction rubbing contact with the bore of the housing during relative axial movement of the tap holder and housing.

SUMMARY OF THE INVENTION

In contra-distinction to the foregoing, the present tap holder and housing assembly has key means which assures low friction relative axial movement of a tap holder and housing with a torque load distributed equally amongst the keys, the keys having non-skidding rolling contact with parallel axially extending faces of complemental grooves in the holder shank and in drive blocks extending through slots of the housing socket and located by a retainer having a clearance fit over the socket to retain the drive blocks of the tap holder coaxially within the housing socket without lateral shifting of the shank of the holder into rubbing contact with the bore of the housing socket. The tap holder and housing in addition have a simple and novel two-spring connection between them so arranged that both springs yieldably oppose relative axial movement in one direction whereas but one spring yieldably resists relative movement in the opposite direction.

BRIEF DESCRIPTION OF THE DRAWING

In the annexed drawing:

FIG. 1 is a side elevation view showing a tap holder assembly according to the present invention;

FIG. 2 is a cross-section view on an enlarged scale taken substantially along the line 2—2 of FIG. 1; and FIGS. 3, 4 and 5 are views taken along the respective lines 3—3, 4—4 and 5—5 of FIG. 2.

DETAILED DESCRIPTION OF A PREFERRED EMBODIMENT

As shown in FIG. 1, the tap holder assembly 1 herein comprises a housing 2 having at one end a shank 3 for mounting as in a threading spindle of a machine tool and having at its other end a socket 4 for axially slidably receiving the shank 5 of a tap holder 6 which, for example, may be a compensating driver such as disclosed, for example, in the M. L. Benjamin et al U.S. Pat. No. 2,778, 648 which includes a collet chuck 7 or the like for gripping a tap T or like tool with its axis coaxial with the shank 5. The shank 5 and socket 4 bore diameters are held to close tolerances so that, for example, the maximum difference between the diameters thereof is 0.002 inch and the minimum difference is 0.001 inch.

To provide an axially yieldable spring connection between the tap holder 6 and the housing 2, the shank 5 has a stepped extension 8 which extends within a sleeve 9 which is retained in the housing 2 by the set screws 10 and which provides a flange II engaging a washer 12, the washer 12 being engaged with a shoulder 14 of the extension 8. A washer 15 retained on the small end of the extension 8 by the snap ring 16 is engaged with a shoulder 17 in the housing 2. Compressed between the washers 12 and 15 is a coil spring 18 and coaxially within the coil spring 18 is a second coil spring 19 compressed between the washer 15 and a shoulder 20 of the extension 8. As evident, when the shank 5 is moved axially toward the right with respect to the housing 2 only the spring 18 is compressed to yieldably oppose such relative axial movement, and when the shank 5 is moved axially toward the left with respect to the housing 2 both springs 18 and 19 are compressed to yieldably oppose axial movement by movement of the washer 12 and shoulder 20 toward the washer 15, the last mentioned washer being held against movement by its engagement with the shoulder 17 in the housing 2.

For non-rotatably keying the shank 5 with respect to the socket 4, the shank 5 is formed with three equally spaced 90° V grooves 21 which extend axially of the shank 5. The socket 4 has three axially extending slots 22 radially therethrough in which drive blocks 23 are fitted with slight circumferential clearance, each drive block 23 being formed with an internal 90° axially extending V groove 24, the V grooves 24 of the drive blocks 23 defining with the respective V grooves 21 of the shank 5 square cross-section openings providing two pairs of perpendicularly related parallel faces. The vertices of the grooves 21 and 24 lie in radial planes passing through the axis of shank 5. In each such square cross-section opening is a pair of perpendicularly related cylindrical rollers 25-26 which have their end faces slightly spaced from the adjacent groove 21 and 24 faces and which have their cylindrical surfaces engaged in rolling engagement with the respective pairs of parallel faces of such square opening.

When the torque load is in the direction indicated by the arrow in FIG. 3 during the tapping operation, the rollers 25 are engaged between one pair of parallel faces of the shank grooves 21 and drive block grooves 24 and relative axial movement of the tap holder 6 and housing 2 against spring 18 effects rolling of the rollers 25 along the grooves 21 and 24 with minimal frictional resistance. When the torque load is in the opposite direction as during unscrewing of the tap T from the work and as shown by the arrow in FIG. 4, the other set of rollers 26 have their cylindrical surfaces in rolling engagement with the other pair of parallel faces of the shank and drive block grooves 21 and 24 as shown in FIG. 4 to provide low resistance axial movement of the tap holder 6 relative to the housing 2. After the position of FIG. 2 has been reached, further axial movement is yieldably opposed by compression of both springs 18 and 19.

In order to accurately hold the shank 5 against lateral movement into rubbing contact with the bore of the socket 4, the socket 4 has loosely fitted therearound with several thousandths of an inch clearance a drive block retainer sleeve 27 (held by snap ring 28) which engages the radially outer surfaces of the drive blocks 23 to retain the drive blocks 23, keys 25–26, and shank 5 in coaxial relation for equal distribution of torque load despite minute errors in spacing of grooves 21 and slots 22.

As previously mentioned, the drive blocks 23 have a slight circumferential clearance with the respective socket slot 22 and by way of example the drive block 23 and slot 22 widths may be made to tolerances wherein there is a minimum difference in width of 0.004 inch and a maximum difference of 0.010 inch.

As well known in the art, the feed of the threading spindle to which the shank 3 of the housing is secured will generally be less than the lead of the tap T and therefore as the tap T is threading a hole in a workpiece, the tap holder 6 will advance toward the right with respect to the housing 2 as viewed in FIGS. 1 and 2 to compress the outer spring 18 while the torque load is imposed on the rollers 25 which have rolling engagement with one pair of faces of the shank and drive block grooves 21 and 24. On the other hand, when the tap T is unscrewed from the work, the tap holder 6 will retract more rapidly than the housing 2 and therefore after the tap holder 6 and housing 2 reach the FIG. 2 position both springs 18 and 19 will be compressed to yieldably oppose relative axial movement in that direction while the torque load is taken up by the rollers 26 which have rolling engagement with the other pair of parallel faces of the shank and drive block grooves 21 and 24.

By reason of the line contacts of the rollers 25–26 with the grooves 21 and 24 the tap holder 1 herein is capable of operation under high torque loads and predetermined axial restraint as determined by the springs 18 and 19.

The embodiments of the invention in which an exclusive property or privilege is claimed are defined as follows:

1. A tap holder assembly comprising a housing having a tubular socket with at least three equally spaced-apart axially extending slots radially through the wall thereof; a tap holder having a shank extending coaxially into said socket; key means keying said housing and holder against relative rotation while permitting relative axial movement thereof; said key means comprising at least three equally spaced-apart axially extending V grooves in said shank, axially extending drive blocks in the respective slots of width slightly less than the width of said slots; said drive blocks having axially extending V grooves in their radially inner faces forming two pairs of perpendicularly related parallel faces with the respective V grooves in said shanks, and circular cross-section keys in said V grooves having rolling engagement with one pair or the other of said parallel faces according to the direction of a torque load imposed on said keys during relative axial movement of said housing and holder; and a retainer sleeve having a clearance fit over said socket and engaged with the radially outer faces of said blocks to retain said keys in engagement with the respective pairs of parallel faces.

2. The assembly of claim 1 wherein said keys comprise a pair of perpendicularly related cylindrical rollers having their cylindrical surfaces engaged between the respective pairs of faces of each shank and drive block groove.

3. The assembly of claim 1 wherein said shank is a sliding fit in said socket but is prevented from high pressure sliding contact with said socket during relative axial movement of said housing and holder by uniform transmission of torque through said key means.

4. The assembly of claim 1 wherein the vertices of said V grooves in said shank and drive blocks lie in radial planes passing through the axis of said shank and wherein said keys comprise a pair of perpendicularly related cylindrical rollers of diameter equal to the spacing of the respective pairs of faces of each shank and drive block groove and of axial length slightly less than the spacing of said faces so as not to interfere with rolling engagement of said rollers as aforesaid.

5. The assembly of claim 1 wherein said shank has a stepped extension; a sleeve secured in said housing to define therewith axially spaced first and second shoulders aligned with respective first and second shoulders of said extension; first and second washers axially movable on said extension; a first coil spring compressed between said washers to yieldably retain said washers in engagement with the respective aligned first and second shoulders; a second coil spring coaxially within said first coil spring compressed between said first washer and a third shoulder of said extension whereby axial movement of said shank in one direction is yieldably opposed by additional compression of only said frist spring by movement of said first washer by the first shoulder of said extension toward said second washer and axial movement of said shank in the opposite direction is yieldably opposed by additional compression of said first and second coil springs by movement of said second washer by the second shoulder of said extension toward said first washer, and by movement of said third shoulder toward said first washer.

* * * * *